Dec. 25, 1962 A. V. POHM 3,070,783
NON-DESTRUCTIVE SENSING SYSTEM
Filed Nov. 24, 1959 3 Sheets-Sheet 1

INVENTOR
ARTHUR V. POHM
BY Cushman, Darby & Cushman
ATTORNEYS

INVENTOR
ARTHUR V. POHM
BY Cushman, Darby & Cushman
ATTORNEYS

INVENTOR
ARTHUR V. POHM

BY Cushman, Darby & Cushman
ATTORNEYS

United States Patent Office 3,070,783
Patented Dec. 25, 1962

3,070,783
NON-DESTRUCTIVE SENSING SYSTEM

Arthur V. Pohm, Ames, Iowa, assignor to Sperry Rand Corporation, New York, N.Y., a corporation of Delaware Filed Nov. 24, 1959, Ser. No. 855,220
44 Claims. (Cl. 340—174)

The present invention relates generally to apparatus for nondestructively sensing the remanent state of magnetization of one or more magnetic cores, and to apparatus for providing means of simultaneously searching the contents of digital data magnetic memory matrices for a specific group of information identified by a known identifier but unknown in memory location. This is accomplished by effectively utilizing the magnetic vector rotational properties possessed by certain magnetic materials.

In very recent years considerable attention has been focused on the use of thin ferromagnetic films as memory and switching lements in digital data processing equipment. The chief advantages of these thin films lie in their improved properties when compared to the more bulky toroidal type ferromagnetic cores presently in common use, these improvements being, among others, higher switching rates, lower drive current requirements, a higher degree of squareness in its hysteresis loop, and zero magnetostrictive effect.

In the Sidney M. Rubens Patent No. 2,900,282, there is and claimed a method of preparing thin ferromagnetic films having the above-mentioned properties by means of a vacuum deposition of a magnetic alloy on a suitable supporting substrate in the presence of an orienting magnetic field. Films prepared according to the teachings of that patent have a single preferred or so-called "easy" axis of magnetization which is aligned with the axis of the orienting field used during the deposition process. It is to be understood that other methods are available for depositing a thin magnetic film, for example thermodecomposition or electro-deposition, and limitation to vacuum deposited films as the magnetic films used in this invention is not intended. It is intended, however, that no matter what means are employed to prepare the film element, the resulting product should have at least one preferred axis of remanent magnetization.

In the copending application of Rubens et al. Serial No. 626,945, filed December 7, 1956, now Patent No. 3,030,612 entitled "Magnetic Apparatus and Methods," there is described a method of switching a magnetic material by the "domain rotational process of remagnetization." This switching method is to be distinguished from the more common wall motion type remagnetization wherein a longitudinal drive field $H_L$ is applied in a direction antiparallel to the remanent magnetization vector aligned with the preferred axis of magnetization. The drive field $H_L$ applied alone causes the domain boundaries between oppositely oriented domains to progressively move such that complete remagnetization results only when all the magnetization is aligned in the reversed direction. In domain rotational switching, a second drive field $H_T$ is applied at an angle preferably transverse to the preferred axis of magnetization of the film along with a longitudinal field. In this case, the individual domains have, in effect, a torque applied thereto causing them to rotate until the opposite state of remanence is obtained.

The present invention utilizes rotational switching to readout or sense from a magnetic element which one of its two stable states the memory element is in without reversing its state, i.e., to nondestructively sense the binary information stored in the magnetic element and to search in a parallel manner a complete array of magnetic elements for specific information identified by a known coding of binary settings, but unknown in storage location. To accomplish the non-destructive sensing, a first drive line is oriented such that a first field produced by a current passing therethrough is at an angle to the preferred axis of the magnetic film elements. This field is of sufficient magnitude to bias the remanent magnetization vector away from the preferred axis of magnetization. A second drive line is oriented such that a current flowing therethrough produces a second field during the existence of the first field at an angle to the preferred axis of the magnetic element which momentarily shifts the remanent magnetization vector away from its biased position. By properly orienting an output or sence winding, a signal is induced therein due to the further rotation of the remanent magnetization by the second field when the film is in a first stable state of remanent magnetization and substantially no signal is induced when the film is in its opposite state of magnetization.

In one embodiment, the first drive line is oriented such that a field produced by the current passing therethrough is transverse to the preferred axis of the magnetic film element. This field biases the remanent magnetization away from its preferred axis of magnetization in a counterclockwise rotational direction when the element is in one state and in a clockwise rotational direction when the element is in the other state, without switching its state. The second drive line is oriented so that a field produced by current passing therethrough is parallel to the preferred axis of the magnetic film. This field which is insufficient even in conjunction with the first field to cause the element to switch states, is effective to momentarily further rotate the remanent magnetization from its biased position. By properly positioning an output line, a signal will be induced therein due to this further momentary rotation of remanent magnetization when the element is in a first state, while substantially no signal is induced therein when the element is in a second state.

In another embodiment of this invention, the first drive line is oriented such that a first field produced by a current flowing therein is at an angle other than transverse to the preferred axis of magnetization. This field temporarily biases the remant magnetization of the film a substantial angular distance from its respective preferred axis in a clockwise rotational direction when the element is in one of its bistable states and in a counterclockwise rotational direction when the element is in the other state, without switching each element to its opposite state. A second drive line is inductively coupled to the element and oriented such that a second field, which even in conjunction with the first field is insufficient to cause the element to change stable states, produced during the existence of the first field by current flowing through the second drive line is applied at an angle preferably, but not necessarily transverse to the first field. The magnitude and direction of the first field is such that the remanent magnetization of the element when in one stable state is biased to a position substantially parallel to the direction of the second field, while the remanent magnetization of the element when in the other stable is biased to an angular position with respect to the direction of the second field. Thus when the element is in one of its stable states, the remanent magnetization in its biased position is relatively unaffected by the application of the second field while when the element is in the other of its stable states, the remanent magnetization in its biased position is further rotated by the application of the second field. A sense or output line having its longitudinal magnetic axis preferably but not necessarily oriented parallel to the direction of the second field is inductively coupled to the element and is used to detect the further rotation or lack thereof of the remanent magnetization due to the second field. The absence of a signal upon the output line during the application of the second field is indicative that the element is in one stable state while the presence of a signal upon the output line during the application of the second field is indicative that the element is in the other stable state.

Another embodiment of this invention comprises a complete digital data memory using the specific drive and output line orientations of the previously mentioned embodiments as applied to a plurality of magnetic elements, means being provided for the parallel searching of the contents thereof for a specific group of information identified by a known identifier but of unknown memory location. In this embodiment, the rotational switching properties of thin ferromagnetic films having at least one easy axis of magnetization along which the remanent magnetic state of each element lies, are used to provide means for the parallel searching of a complete memory matrix. In addition to the conventional windings, which provide rapid addressable non-destructive reading and writing, the memory is equipped with suitably arranged drive windings called strobe and interrogate windings and sense or output windings to accomplish the above-mentioned parallel search operation.

In this respect, each digit plane is provided with a first or so called interrogate winding which, when current is passed in a first direction therethrough, produces a first field at an angle to the remanent magnetization of each film inductively coupled thereto. This field temporarily biases the remanent magnetization of each film a substantial angular distance from its respective preferred axis in a clockwise rotational direction when the element is in its first bistable state and in a counterclockwise rotational direction when the element is in its second state, without switching the element to its second state. Each digit plane is also provided with a suitably arranged second or so called strobe winding which is inductively coupled to all the cores in that plane. While the first field is still in effect, a second field which even in conjunction with the first field is insufficient to cause the film elements inductively coupled thereto to change states, is applied to each core in the plane at an angle to the first field by passing a current through the second winding. The direction and magnitude of the first field is such that the remanent magnetization of each element coupled thereto and lying in its first stable state is biased to a position substantially anti-parallel to the second field, while the remanent magnetization of each element coupled thereto which is in its second stable state is biased to an angular position with respect to the second field. Thus the remanent magnetization of those elements which are in the first state will be substantially unaffected by the application of the second field, while the remanent magnetization of those elements which are in their second state will be further rotated by the application of the second field. A plurality of sense or output lines are inductively coupled a different one to each element occupying the same coordinate location in each plane, i.e., to each element forming part of a word register. Each output line is oriented so as to detect the further rotation or lack thereof of the remanent magnetization of each film element inductively coupled thereto from its biased position due to the application of the second field. In its preferred position each output line is oriented such that its longitudinal magnetic axis lies parallel to the direction of the second field. Thus when the second field is applied, a signal is induced in each output line by the elements lying in their second stable state while substantially no signal is induced in the output line by the cores lying in their first stable state.

By reversing the direction of the first field, the remanent magnetization of each film inductively coupled thereto is biased a substantial angular distance from its respective preferred axis in a counterclockwise rotational direction to an angular position with respect to the direction of the second field when the element is in its first stable state and in a clockwise rotational direction to a position parallel to the direction of the second field when the element is in its second stable state. Now, when the second field is applied, a signal is induced in each output line by the elements lying in their first stable state while substantially no signal is induced in the output line by the film elements lying in their second stable state. The first direction of the first field corresponds to a search for a binary "1" for example, while the second direction corresponds to a search for a binary "0." By applying a plurality of binary signals corresponding to the known binary code of stored information of unknown location, one to each interrogate line, bit by bit, according to a known digit order, the entire memory can be searched in a parallel manner without duplication of storage elements. A signal will be produced on all output lines inductively coupled to elements which do not contain the known binary coded after information. The absence of a signal on an output line is indicative that the known information is stored in the elements therein associated.

It is, therefore, a primary object of the present invention to provide improved means for non-destructively sensing the remanent state of a memory element.

Another object of this invention is to provide for non-destructive sensing of a memory element by using coincident current-type readout.

Still another object of this invention is to provide means of non-destructively sensing the binary information contained in a memory element by effectively utilizing the domain rotational properties of the memory element.

A further object of this invention is to provide a memory element whose information is detected by the presence or absence of an induced signal on a sense winding.

Another object of the present invention is to provide an improved magnetic memory for a digital computer.

Yet another object of the present invention is to provide a magnetic memory which can be interrogated in a parallel mode to determined the presence or absence of a desired piece of information.

Still another object of this invention is to provide a memory which can either be sequentially addressed or simultaneously searched.

Other objects and advantages of this invention will become obvious to those having ordinary skill in the art by reference to the following detailed description of exemplary embodiments of the apparatus and appended claims. The various features of the exemplary embodiments may best be understood with reference to the following drawings, wherein:

Figure 1:
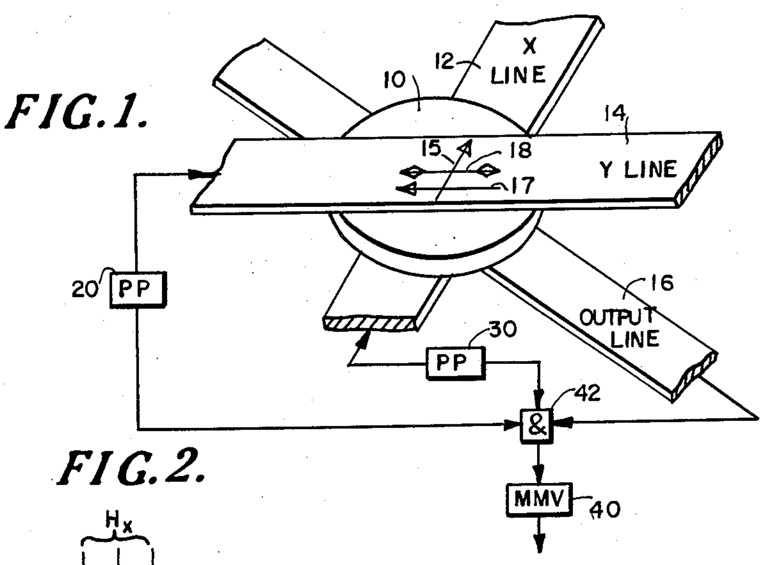
FIGURE 1 illustrates a magnetic storage element, the respective physical orientations of the drive lines to which it is inductively coupled and the electrical connections by which the concepts of this invention are utilized.

Referring now to FIGURE 1 in which is shown the first embodiments of this invention, it can be seen that there is a magnetic storage element 10 along with drive lines 12 and 14 and output line 16. Element 10 is preferably of the thin film type prepared, for example, according to the teachings of the aforementioned Rubens patent, but limitation thereto is not intended. It is intended that each film has at least one preferred axis of magnetization along which the remanent magnetization of the element is stored. The various drive lines may be windings of any sort but preferably are conductive sheets produced by conventional printed circuit techniques.

In FIGURE 1, the direction of the preferred axis is indicated by line 18. Aligned with the preferred axis is the Y drive line 14 which when pulsed with a current from power pulse source 20 produces a magnetic field 15 which is transverse to the preferred axis. The X drive line 12, which is oriented transverse to the preferred axis 18 of the film element 10, is employed to produce the interrogating field 17 parallel to the remanent magnetization of the thin film element. Output line 16 as shown is oriented such that its longitudinal magnetic axis lies at an angle to the preferred axis of storage element 10. This orientation will be discussed more fully hereinbelow.

Figure 2:
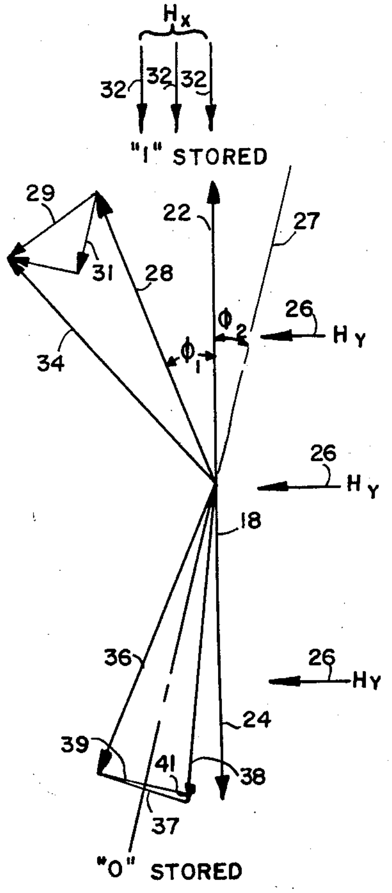
FIGURE 2 illustrates by use of magnetic vectors a mode of operation of the apparatus of FIGURE 1.

The operation of the above-mentioned windings, acting in cooperation with the magnetic information storage element to obtain non-destructive sensing, may best be understood by reference to the vector diagram of FIGURE 2. FIGURE 2 illustrates vectorially the magnetic field conditions existing during the non-destructive sensing process. It may be arbitrarily assumed that a binary "1" is stored in element 10 when the remanent magnetization, as represented by vector 22, is oriented in the direction of a field produced by positive Y-current, while a binary "0" is stored therein when the remanent magnetization is oriented in the negative Y-current field direction as indicated by vector 24. In both cases the direction of this remanent magnetic field is aligned with the established preferred axis 18 of the magnetic storage element.

Figure 3:
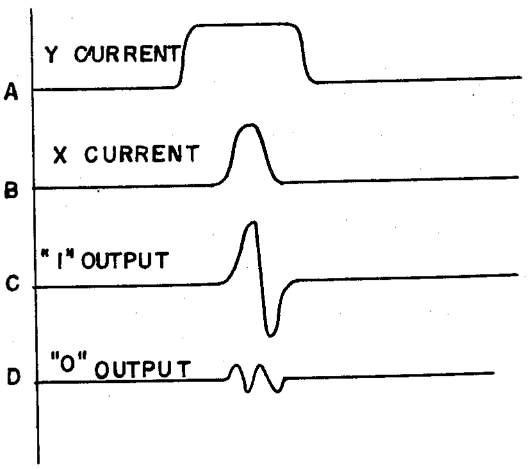
FIGURE 3A illustrates a wave shape for the biasing current pulse.
FIGURE 3B illustrates a wave shape for the interrogating current pulse.
FIGURE 3C illustrates an output signal obtained from the sense winding when the magnetic element is in a first stable state.
FIGURE 3D illustrates an output signal when the memory element is in its other stable state.

In describing the sensing operation, it will further be assumed that the storage element is first in its arbitrarily defined "1" state, i.e., the remanent magnetization is directed upward as shown by vector 22. To sense this condition, a current pulse such as that illustrated in FIGURE 3A is applied first in time by means of power pulse source 20 to the bias or Y drive line 14 of FIGURE 1. The current passing through winding 14 produces a cross or transverse field $H_Y$ such as indicated by vectors 26 in FIGURE 2. This field in effect produces a torque on the magnetic domain tending to rotate the remanent magnetization vector counterclockwise away from its preferred axis to a new position indicated by vector 28 at some predetermined angle $\theta_1$ with respect to the preferred axis of the storage element.

Figure 7:
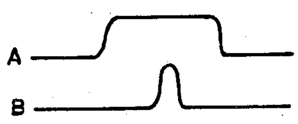
FIGURE 7 illustrates typical pulse waveforms employed during a searching operation.

FIGURE 7 of the aforementioned Rubens et al. application Serial No. 626,945, illustrates the concept of rotational threshold. It can be seen from the disclosure therein that no matter how large the transverse field component may be, that component itself cannot cause complete rotational reversal of the remanent magnetization, i.e., in the absence of a longitudinal switching field component. It is possible, however, that the application of an excessively large transverse field will rotate the magnetization to the rotational switching threshold, and when released the magnetization vector falls to a preferred remanent state causing switching of the core if the resulting state is not the same as the initial state. Therefore, the amplitude of the current pulse producing the transverse or bias field is limited such that the initial magnetic state of the film is not deleteriously effected.

While the transverse bias field $H_Y$ indicated by vectors 26 is still effective, a second current pulse is applied to the system by means of power pulse source 30 and interrogate winding or X drive line 12. Since winding 12 is oriented perpendicular to the preferred axis 18 of the film, the resulting interrogate field $H_X$ indicated by vectors 32 in FIGURE 2 is parallel to preferred axis 18. Because the magnetization of the film, in its biased position is already at an angle $\theta_1$ with respect to the preferred axis, the effect of the interrogate field as indicated by vectors 32 is to apply a torque to the already biased magnetization thereby further rotating this magnetization to a new position which may be indicated by vector 34. The FIGURE 3B interrogate pulse, which is embraced timewise by the FIGURE 3A pulse, is of such a magnitude and duration that the field 32 produced thereby when cooperating with the biasing field as represented by vectors 26 is insufficient to completely rotate the film magnetization by 180°, i.e., to switch the remanent state of the film. The effect of the relatively short interrogate pulse, then, is to rotate the magnetization of the thin film momentarily, which rotation in turn produces a detectable change in flux. The means utilized to detect this flux change is the output or sense winding 16 located in inductive relationship with the storage element 10 preferably so as to obtain optimum flux linkage. To insure optimum flux linkage, windings 12, 14 and 16 preferably have at least substantially the same width as storage element 10. In FIGURE 1, however, the windings are shown as having a width somewhat less than the diameter of the storage element for clarity in depicting their cooperative relationship.

It can be seen from FIGURE 2 that the magnetic axis 27 of the output winding is at an angle $\theta_2$ with respect to the preferred axis of the storage element. Angle $\theta_2$ preferably is selected such that the major component of change in flux resulting from the rotation of the magnetization from position 28 to position 34 by the application of an interrogate field is parallel to the magnetic axis (as distinguished from the longitudinal physical axis) of the output winding, i.e., the change in flux represented by vector 29 has a major component, as represented by vector 31, parallel to the longitudinal magnetic axis 27 of output line 16. The change in flux being substantially parallel to this axis induces a rather large voltage in sense winding 16. The waveform of FIGURE 3C illustrates the voltage signal induced in the sense winding produced by the application of an interrogate pulse to the storage element when it is in a remanent state arbitrarily indicative of a binary "1." When the $H_X$ field subsides, the remanent magnetization returns to its initially biased position 28, and further relaxes back into alignment with the preferred axis upon release of the $H_Y$ field.

As mentioned before, it is arbitrarily assumed that a binary "0" is stored in the magnetic element when the magnetization vector is pointed in the negative Y-current direction as indicated by vector 24. To sense this condition, both the bias field $H_Y$ as represented by vectors 26 and the interrogate field $H_X$ as represented by vectors 32 are again applied in the same time sequence and direction as before. The application of the bias field produces a rotation of the magnetization clockwise away from the preferred axis to a biased position which is indicated by vector 36. When the interrogate pulse of FIGURE 3B is applied to winding 12, the resulting $H_X$ field indicated by vectors 32 again applies a torque to the remanent magnetization in its biased position as represented by vector 36, but now vector 36 is rotated back toward the preferred axis of the element to a new position such as that indicated by vector 38, for example. This momentary change in direction of remanent magnetization again produces a change in flux which induces a voltage signal in the output winding 16. However, because of the orientation of the output winding, the major component of change in flux produced by the rotation of the remanent magnetization from its biased position as represented by vector 36 to its position as represented by vector 38 is substantially perpendicular to the magnetic axis of the sense winding and has only a very small component parallel to the output axis 27 that is, the change in flux as represented by vector 37 has a major component as represented by vector 39 which is perpendicular to the magnetic axis 27 of the sense line, and a very small component 41 parallel to this axis. As a result, only a small signal is induced in the sense winding the amplitude of the induced signal being a function of the magnitude of the parallel component. This small signal as represented by the waveform of FIGURE 3D is twice the frequency of the "1" output signal shown in FIGURE 3C, because it crosses the output line magnetic axis 27 twice, may then be indicative of a binary "0" either by its amplitude or frequency. By employing discriminating circuitry, for example, a conventional monostable multivibrator trigger circuit 40 in the output apparatus, for voltage amplitude discrimination the presence of an output signal therefrom may be indicative of a binary "1" while the complete absence of an output signal from this discriminating circuit due to the inability of the induced signal to trigger the multivibrator at the moment of sensing may be indicative of a binary "0."

It should be noted that since an amplitude discrimination means is used to differentiate between a binary "1" and "0," the output line 16 is oriented so as to achieve a maximum induced signal when the element is in one state and a minimum induced signal when it is in the other state. However, the output line may be oriented at other angles relative to the preferred axis of magnetization without departing from the scope of this invention, for example, the output line magnetic axis could be parallel to the preferred axis or perpendicular thereto. In the former case an amplitude discrimination means would be employed while in the latter, a phase discrimination means would be utilized.

The rotation of the magnetization from position 22 to position 28 or from position 24 to position 36 produced by the application of biasing field 26 alone may induce an unwanted noise signal in the output winding. To eliminate this problem, a suitable gate circuit 42 may be utilized as shown in FIGURE 1. For example, the interrogate pulse from power pulse source 30 and the bias pulse from power pulse source 20 may be used as two of the inputs to a suitable diode "AND" gate 42 while the signal induced in the output winding by the change in flux caused by the rotation of the remanent magnetization from its preferred axis of magnetization may be used as a third input. Gate 42 is designed such that a large input from the output line causes a large output from the gate while a small input from the output line causes a small output from the gate. Under this condition, an output pulse from the "AND" gate occurs only at the moment of the application of the interrogate pulse and any other spurious signal caused by the application or removal of the biasing field is ineffective in producing an output.

Figure 4:
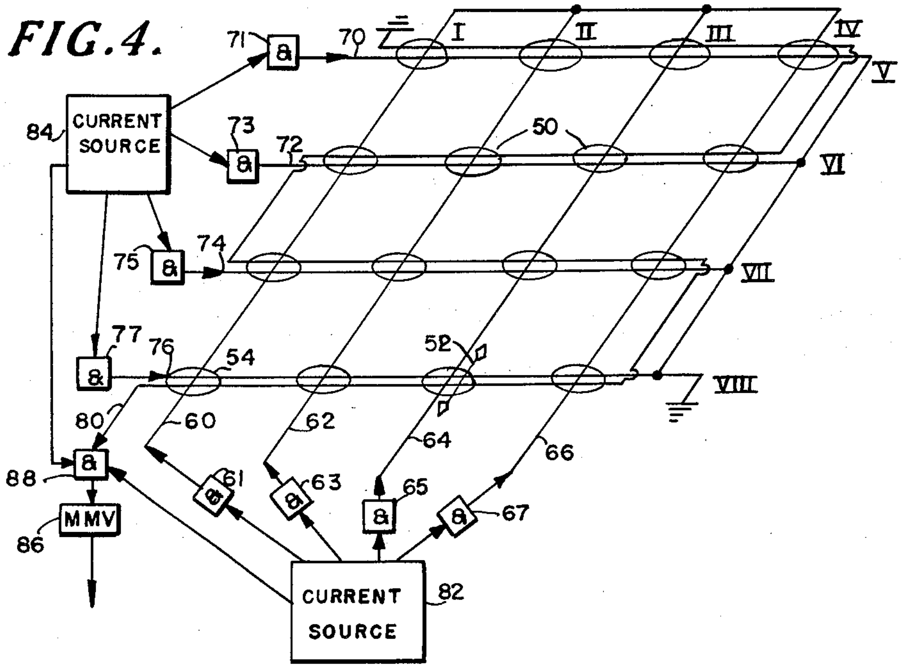
FIGURE 4 illustrates the first embodiment as used in a memory matrix.

In FIGURE 4 there is shown a two dimensional memory array employing the means of FIGURE 1 to non-destructively sense the information contained thereon. A plurality of film elements 50, identical in physical properties to those of film element 10 in FIGURE 1, each having its preferred axis of magnetization lying in the direction indicated by line 52 are arranged in column I, II, III, and IV, and rows V, VI, VII, and VIII. A first plurality of lines 60, 62, 64 and 66 oriented as shown are respectively inductively coupled to the cores in columns I, II, III and IV. A second plurality of lines 70, 72, 74 and 76 oriented transverse to lines 60 through 66 are respectively inductively coupled to the cores in rows V, VI, VII and VIII. One output or sense line 80 oriented parallel to the second plurality of lines at least for the area of inductive coupling with each core element is inductively coupled to each element contained in the matrix. Each of the first plurality of lines 60–66 correspond to line 14 in FIGURE 1, while each of the second plurality of lines 70–76 corresponds to line 12 with respect to any given film element. Output line 80 corresponds to line 16 in FIGURE 1.

The non-destructive sensing system is operated in a manner similar to a conventional coincident current system. Current from source 82 selectively applied to one of drive lines 60, 62, 64 or 66 by means of "AND" gates 61, 63, 65 and 67 (enabling inputs not shown) applies a first or biasing magnetic field to all of the magnetic elements inductively coupled thereto, i.e., the thin films located in column I, II, III, or IV as the case may be. This field corresponds to the above mentioned Y-drive line biasing field and serves to rotate the remanent magnetization of each film element as above described. Current from source 84 selectively applied to one of drive lines 70, 72, 74 or 76 by means of "AND" gates 71, 73, 75, and 77 (enabling input not shown) applies a second magnetic field transversely of the first magnetic field to all the cores inductively coupled thereto, i.e., the cores located respectively in the selected row V, VI, VII or VIII. This field will further rotate the remanent magnetization of the core receiving both fields as previously described, but will have substantially no effect on the remainder of the cores in the selected row. With this arrangement, both fields are applied coincidently to only one film element in the entire array thereby both selecting the film element and performing the above described nondestructive sensing operation thereon.

Assume it is desired to non-destructively sense one of the film elements contained in the array, e.g., film element 54. A current pulse of the shape shown in FIGURE 3A from source 82 is selectively applied by means of "AND" gate 61 to drive line 60. This current pulse produces a first field, insufficient in magnitude to cause the elements coupled thereto to change stable states, which biases the remanent magnetization of each core in column I away from its preferred axis of magnetization, in a counterclockwise or clockwise rotational direction depending on which of its stable states each film element exists. A second current pulse, second in time and of the shape shown in FIGURE 3B is selectively applied by means of AND gate 77 to drive line 76. This current pulse produces a second field, insufficient in magnitude even in conjunction with the first field to cause the elements coupled thereto to change stable states, which is parallel to the preferred axis of magnetization of each film contained in row VIII. Since the remanent magnetization of element 54 is biased from its position along the preferred magnetization axis, the second field is applied at an angle thereto causing still further rotation thereof. As explained in reference to FIGURE 2, this further rotation of the remanent magnetization of element 54 will either result in a substantial induced signal on output line 80, or a small noise type signal thereon depending on the state of element 54. By again employing conventional voltage discriminating circuitry, for example a monostable multivibrator trigger circuit 86 in the output or sensing apparatus, the presence of an output signal therefrom is indicative that element 54 is in one stable state, e.g., a binary "1" state, while the complete absence of a signal from circuit 86 due to the inability of the induced signal to trigger the multivbrator at the moment of sensing is indicative that element 54 is in its other stable state, e.g., a binary "0" state.

It should be noted that the remaining film elements in column I and row VIII each receive one field. The rotation of the remanent magnetization of each core in column I due to the application of the first field may induce an undesired noise type signal in output winding 80. To eliminate this problem, a suitable gate circuit 88 may be employed. For example, the bias pulse from current source 82 and the interrogate pulse from current source 84 may be used as two of the inputs to the conventional AND gate 88, while the signal induced in the output winding may be used as a third input. Gate 88 is designed such that the output signal therefrom is large when the signal from the output line is large and is relatively small when the signal from the output line is relatively small.

The remaining elements in column VIII also receive one field. Since this field is applied later in time but still during the existence of the first field, AND gate 88 is enabled thereby to pass a pulse from sense line 80. Therefore it is important that these remaining elements, i.e., all the elements in row VIII except element 54 do not induce any substantial signal on output line 80 due to the second field. If these elements did induce a signal thereon, the effect of such a signal from any one of them or the signal resulting from the combined effect of each, could cause the voltage discriminating circuit 86 to be triggered. This would be permissable when element 54 is in the "1" state as arbitrarily defined above. However, if element 54 is in the "0" state, an erroneous result could be obtained. This problem is eliminated in the preferred embodiment of FIGURE 4, by orienting each drive line in the second plurality of lines at 90° to the preferred magnetic axis of each element inductively coupled thereto, thereby producing a magnetic field whose direction is either parallel or antiparallel to remanent magnetization of each element in its unbiased stable state. Since this field is not of sufficient magnitude to switch the elements by so-called wall motion, and since the second field is parallel or antiparallel to the remanent magnetization when in its unbiased stable state thereby causing substantially no rotation thereof, the application of the second field will cause substantially no signal to be induced on output line 80 from the remaining cores contained in row VIII.

While FIGURE 4 only shows a two dimensional memory matrix, limitation thereto is not intended. By further extending the concepts herein contained, it is possible to construct a three dimensional matrix capable of coincident current non-destructive sensing. The plane of FIGURE 4, provides sixteen addresses for a single bit of information. Another plane may be added for each additional bit desired, with a separate sense line per plane. Thus it is seen that by using two coincident currents, a single core in a matrix of cores may be selectively non-destructively sensed. It is understood that the apparatus of FIGURE 4 is only one way of employing the non-destructive sensing technique as explained in connection with FIGURES 1 and 2 to an entire array using coincident currents. It is not intended thereby to limit this technique to this embodiment.

Figure 5:
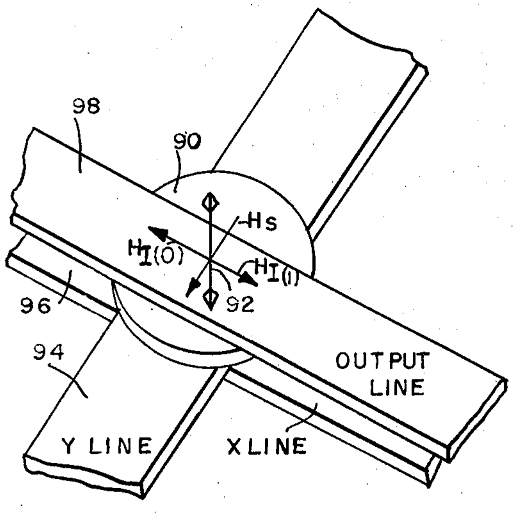
FIGURE 5 illustrates another embodiment of this invention wherein a magnetic film and the respective physical orientations of the drive lines inductively coupled thereto are shown.

Other non-destructive sensing embodiments of this invention are illustrated in FIGURE 5 wherein there is shown a magnetic storage element 90 of substantially identical physical properties as element 10 in FIGURE 1, having a preferred axis of magnetization 92 along with drive lines 94, 96, and output line 98. Element 90 is preferably of the thin film type prepared according to the teachings of the aforementioned Rubens patent but limitation thereto is not intended.

Figure 6:
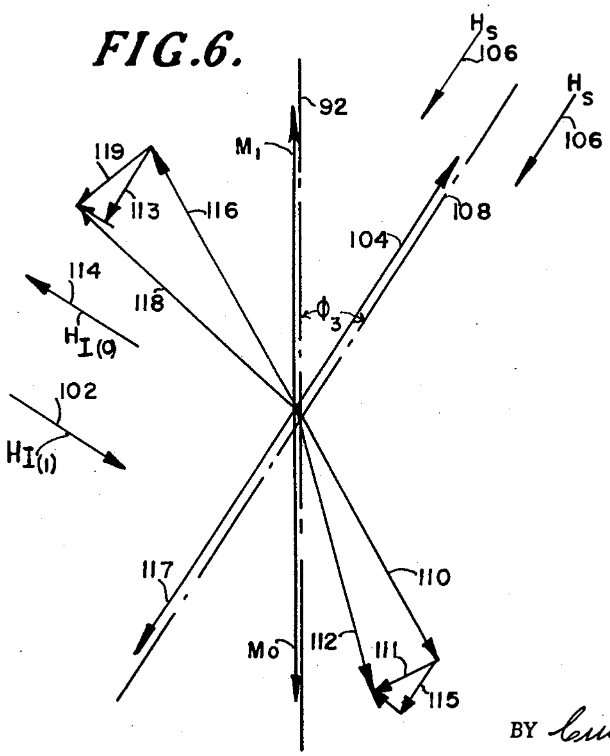
FIGURE 6 illustrates by use of magnetic vector representation the operation of the apparatus of FIGURE 5.

The operation of the non-destructive sensing system of FIGURE 5 is best understood by reference to FIGURE 6 wherein a magnetic vector representation of the system is shown. The preferred axis of magnetization is represented for convenience in FIGURE 6 by dashed line 92. It is arbitrarily assumed for descriptive clarity that when the element is in its binary "1" stable state, the remanent magnetization lies along the preferred axis 92 in a direction represented by vector $M_1$, and when the element is in its binary "0" stable state, the remanent magentization lies along the preferred axis 92 in a direction represented by vector $M_0$. Now assume for the moment that element 90 is in its binary "1" stable state and it is desired to non-destructively sense the state of the element. A current pulse such as that shown in FIGURE 7A flowing through a Y drive or interrogate line 94 produces a magnetic field $H_{I(1)}$ having a direction as represented by vector 102. This field temporarily biases the remanent magnetization a substantial angular distance from its position as represented by vector $M_1$ in a clockwise rotational direction to a new position as represented by vector 104. Another current pulse like that illustrated in FIGURE 7B, applied second in time to the current pulse flowing through line 94 but during its existence through an X drive or strobe line 96, produces a field $H_S$ as represented by vectors 106. This field is of insufficient magnitude even in conjunction with the $H_{I(1)}$ field to cause element 90 to change states. In its preferred directions, the $H_S$ field is transverse to the $H_{I(1)}$ field. This, however, is not essential. It is essential, however, that the $H_S$ field be at an angle to the $H_I$ field. The magnitude and direction of the $H_{I(1)}$ field represented by vector 102 is such that the remanent magnetization in its biased position as represented by vector 104 is parallel to the direction of the $H_S$ field. Thus the application of $H_S$ field produces no further rotation of the remanent magnetization from its position as indicated by vector 104. An output or sense line 98 having a magnetic axis as represented by dashed line 108 is inductively coupled to element 90 at an angle $\theta_3$ with respect to the preferred axis 92. The preferred range for the angle $\theta_3$ is not greater than 45° nor less than one-half of the reversible limit of the film. For most films the preferred range may be expressed by the inequality 30° $<\theta>$ 45°. But since there may exist some variation among films, limitation to this range is not intended. In its preferred position output line 98 is parallel to drive line 96. The purpose of output line 98 is to sense any further rotation of the remanent magnetization from its biased position due to the application of the $H_S$ field. Since the remanent magnetization in its biased position 104 is not further rotated by field 106, there is substantially no induced signal therein. This lack of a signal is indicative that the element 90 is in a binary "1" stable state. Upon release of the applied fields, the magnetization vector rotates back to its initial position.

Now assume element 90 is in a binary "0" stable state as represented by vector $M_0$ and it is desired to non-destructively sense the element. The $H_{I(1)}$ field as represented by vector 102 is applied as before causing vector $M_0$ to be biased counterclockwise from its position along the preferred axis of magnetization 92 to a new position as represented by vector 110. The $H_S$ field as represented by vector 106 is next applied in the same time relationship as before. However, since the remanent magnetization in its biased position 110 is at an angle to the $H_S$ field, the remanent magnetization will be momentarily further rotated to a position as indicated by vector 112, i.e., back toward the preferred axis 92. This further rotation causes a substantial signal to be induced in output line 98 which is then representative that a binary "0" is stored in element 90, when the applied fields are removed, the remanent magnetization returns to its unbiased position along the preferred axis 92.

The embodiment shown in FIGURE 5 may also be operated to cause non-destructive sensing of the thin film 90, by applying the interrogating or biasing field in a direction opposite to that shown by vector 102. That is, when a pulse of current such as that shown in FIGURE 7A is applied to the Y line 94 in such a direction as to cause a biasing field in the direction shown by vector 114 in FIGURE 6, with the X line 96 receiving a FIGURE 7B type current pulse in the timed relationship indicated in FIGURE 7, non-destructive sensing of the state of the magnetic element will result. In more detail, the application of the $H_{I(0)}$ field as represented by vector 114 will cause the remanent magnetization to be rotated clockwise or counterclockwise according to the existing state of the magnetic element. If the element is in a "1" state, the magnetization vector $M_1$ is rotated by the biasing field to a position indicated by vector 116. On the other hand, if the magnetic element is in a "0" state, the remanent magnetization vector $M_0$ is rotated to the position indicated by vector 117. The strength of the biasing field $H_{I(0)}$ is such that the angle of rotation of the remanent vector places the biased remanent magnetization, when the element is in a "0" state, in line with the magnetic sense line axis 108 along which a second field $H_s$ as represented by vectors 106 is momentarily applied during the existence of the biasing field. Therefore, when the element is in a "0" state, only a small signal will be induced in the longitudinal direction of the output line 98 since the field $H_s$ is relatively small and only urges the element into saturation.

However, when the magnetic element is in a "1" state, and the remanent magnetization is biased to the position shown by vector 116, the application of the $H_s$ field causes the biased magnetization to rotate still further, as to the position shown by vector 118. The second rotation of a remanent magnetization is less than that required to switch the magnetic element, and consequently upon release of the applied fields, the remanent magnetization reversibly rotates back to its initial position along the preferred axis 92. The change of magnetization from its initially biased position 116 to its biased position 118, is indicated by vector 119. Since this vector is not fully parallel to the magnetic axis 108 of the output line, only the parallel component 113 is effective in inducing a signal in the output line. This induced signal is considerably larger than any induced in the output line when the magnetic element is in a "0" state, and can therefore be distinguished therefrom to indicate the state of the thin film without destroying that state.

From the foregoing it is apparent that the apparatus of FIGURE 5 may be operated in either of the two just described different manners to cause non-destructive sensing. Either of these modes of operation have certain similarities to the non-destructive sensing system previously described relative to FIGURES 1–3, in that all three systems employ a biasing field for rotating the remanent magnetization to a biased position, and while in that position there is applied a second field which in combination with the bias field effects an output which indicates the state of the magnetic element being sensed without destroying that state. Like the system of FIGURE 1, the system of FIGURE 5 when operated in either of its modes, may be employed in a two or three dimensional matrix to effect non-destructive sensing of any given bit position or register therein, in an arrangement similar to that illustrated in FIGURE 4. The AND output circuitry of FIGURE 1 may be employed with the system of FIGURE 5 if desired.

Figure 8:
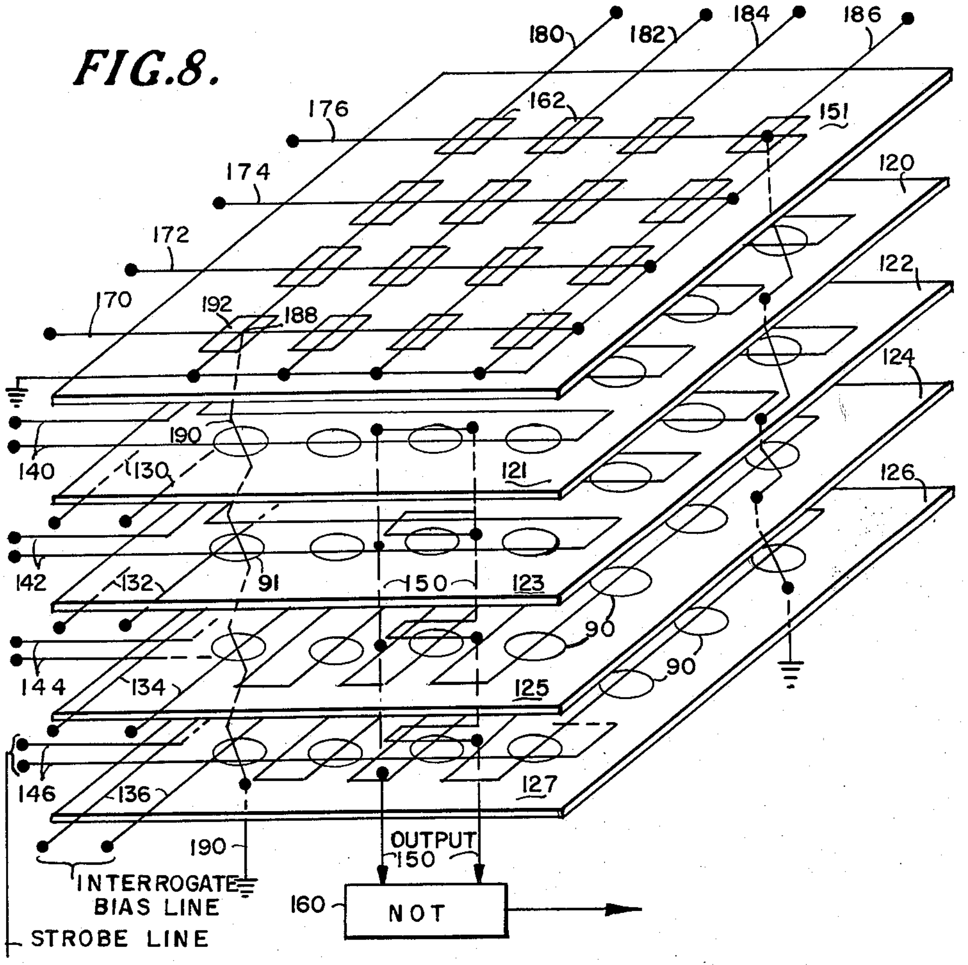
FIGURE 8 illustrates another embodiment of this invention wherein a complete memory matrix capable of a parallel search operation is shown.

Although any of the non-destructive systems above described might well be employed to effect parallel searching of a three dimensional memory matrix in an effort to find a given binary word therein, the system of FIGURE 5 is particularly referred to for descriptive purposes, and this is the reason why the biasing fields as represented by vectors 102 and 114 in FIGURE 6 have been referred to as "interrogating" fields with designations $H_{I(1)}$ and $H_{I(0)}$, instead of biasing fields as their counterpart $H_Y$ in FIGURE 2 was termed. For similar reasons, the other field as represented by vector 106 in FIGURE 6 is termed the "strobe" field even though it corresponds to what was termed relative to FIGURE 2, the $H_X$ or interrogating field. As will become more apparent, when the thin film element 90 of FIGURE 5 or its counterparts in FIGURE 8 is or are being searched for the presence of binary "1," the external biasing or interrogating field is designated $H_{I(1)}$ and is applied in the direction indicated by vector 102 in FIGURE 6, while if the storage element is being searched for the presence of a binary "0," the biasing interrogate field as applied in the direction of vector 114 is designated $H_{I(0)}$. Further reasons for the functional terminology and designations will become more evident in the following description of a parallel searching technique in relation to FIGURES 5–8.

There are four possible sets of conditions which may occur in a memory element during a searching process. These conditions are as follows:

(A) "1" stored, "1" being sought for;
(B) "1" stored, "0" being sought for;
(C) "0" stored, "0" being sought for, and
(D) "0" stored, "1" being sought for.

As mentioned previously, with a binary "1" stored in the film element 90 of FIGURE 5, the remanent magnetization is aligned with preferred axis 92 in the direction of vector $M_1$ as shown in FIGURE 6. To determine whether or not a "1" is stored in the film element, an external interrogate biasing field $H_{I(1)}$ is applied in the direction indicated by vector 102 and during its existence, strobe field $H_s$ is momentarily applied in a direction indicated by vectors 106, i.e., parallel to the magnetic axis of the sense line. The magnitude of the $H_{I(1)}$ field is such that the remanent magnetization $M_1$ is rotated clockwise to a biased position indicated by vector 104 which is antiparallel to the direction of strobe field $H_s$. Since the remanent magnetization in its biased position is aligned with the strobe field $H_S$, there will be no further rotation of the remanent magnetization from its biased position as represented by vector 104 due to the strobe field $H_s$. Since the strobe field $H_S$ under such conditions fails to produce any further rotation of the remanent magnetization of the storage element, no further change in flux linkage of any moment will be detected by the output winding during the application of the strobe field. Hence, for case A when a binary "1" is stored in a particular film element and that element is being interrogated to determine whether a binary "1" is actually stored therein, there will be no substantial signal induced in the output winding associated with film 90.

In case B a binary "1" is unknowingly stored in the film, but now it is desired to determine whether or not a binary "0" is stored therein. Again, with a "1" stored in the film element, the remanent magnetization is aligned with the preferred axis 92, in the direction indicated by vector $M_1$. Since the search is for a "0," the interrogating field $H_{I(0)}$ is applied to the film in the direction indicated by vector 114 causing the remanent magnetization $M_1$ to be rotated into alignment with interrogating field $H_{I(0)}$, i.e., in this case counterclockwise to a biased position such as indicated by vector 116. While the interrogate field $H_{I(0)}$ is still effective, the strobe field $H_S$ is again applied in the direction indicated by vectors 106. Since in this case the remanent magnetization in its biased position 116 is at an angle with respect to the strobe field $H_S$, a torque will be applied to the remanent magnetization further rotating this magnetization from the position indicated by vector 116 to a new position indicated by vector 118. This latter rotation produces a change in flux linkage as represented by vector 119. Since a component of vector 119 lies parallel to the sense line magnetic axis 108, a signal is induced in the output or sense line 98.

Thus, it can be seen that when the information contained in storage element 90 is identical to the information being sought substantially no output signal results; whereas when there is no correspondence between the stored information and the information being sought, a signal is induced in the output line.

In case C, a binary "0" unknowingly contained in memory element 90 and it is desired to interrogate that element to determine whether or not a "0" is stored therein. As mentioned before, a binary "0" is stored in the memory element when the remanent magnetization is aligned with the preferred axis of magnetization in the direction indicated by vector $M_0$ in FIGURE 6. As before in case B, a "0" is being sought, so the interrogate field $H_{I(0)}$ is applied, in the direction indicated by vector 114. The effect of this externally applied interrogate field is to bias the remanent magnetization in the magnetic film element clockwise from the position indicated by vector $M_0$ into a position represented by vector 117 which is aligned with the sense line magnetic axis 108. Again, the strobe field $H_S$ is applied parallel to the sense line magnetic axis 108 momentarily during the interval that the interrogate field $H_{I(0)}$ is still in effect. Since in its biased position the remanent magnetization vector 117 is parallel to the strobe field $H_S$, no further rotation of the remanent magnetization will result. Therefore, there will be substantially no change in the amount of flux linking output line 98 and hence substantially no signal induced in this sense line.

Finally, for case D, wherein a binary "0" is unknowingly contained in memory element 90 and it is desired to interrogate that element to determine whether or not a "1" is stored therein, the interrogate field $H_{I(1)}$ is applied in the direction indicated by vector 102. The effect of this field is to rotate the remanent magnetization from its stable state position as indicated by vector $M_0$ to the position indicated by vector 110. The strobe field $H_S$ is now applied in the same direction as in the previous three cases, i.e., the direction indicated by vectors 106. Since the remanent magnetization in its biased position 110 is at an angle to the direction of the strobe field $H_S$, the remanent magnetization will be momentarily rotated from its biased position to that indicated by vector 112. This further rotation produces a change in flux as indicated by vector 111. Since a component of vector 111 lies parallel to the longitudinal magnetic axis 108 of output line 98, a signal is induced in the output line to indicate that the binary "1" sought was not present.

It is important to notice (this importance will become more obvious when considering this search technique as applied in a complete matrix) that in both case B and case D, the direction of the parallel component of the change in flux, respectively indicated by vectors 113 and 115, is the same. As a result the induced signal in both of the above-mentioned cases will be of the same polarity and hence there can be no cancellation of signals when more than one storage element is being searched at one time. Because of this fact, the same output winding can be associated with more than one storage element and, therefore, it is possible to construct a memory having one output line for each word contained in the memory.

Such a memory is shown in FIGURE 8 wherein there are a plurality of storage elements 90 arranged on substrates 120, 122, 124 and 126, in a 4×4×4 matrix array. It should be understood that this configuration is intended only to illustrate the invention without limitation. In actual practice, a realistic memory size may be 32×32×24, i.e., 1024 word storage registers each 24 binary digits in length.

The array is comprised of a plurality of storage elements 90 having the required magnetization rotational properties, there being 16 elements illustrated as thin circular films on each substrate 120, 122, 124, and 126. The substrates respectively lie in digit planes 121, 123, 125, and 127, each of which is provided with its own drive or interrogate winding line 130, 132, 134, 136 inductively coupled to all the cores contained in the respective plane. A current pulse like that in FIGURE 7A when applied to an interrogate line such as line 134, sets up a biasing interrogate field $H_{I(1)}$ similar to that indicated by vector 102 in FIGURE 6 in each storage element in plane 124. Similarly, another pulse opposite in direction but of the same shape as the pulse in FIGURE 7A, when applied to an interrogate line produces an $H_{I(0)}$ field, like that indicated by vector 114 in FIGURE 6, in each inductively coupled film. In addition to an interrogate winding line, each plane is provided respectively with another drive or strobe winding line 140, 142, 144, 146, each such line being inductively coupled to each storage element in its respective plane. The strobe windings 140 through 146 and respectively associated interrogate windings 130 through 136 (for example, windings 136 and 146) are arranged such that the fields produced thereby in any associated core element are mutually perpendicular as are the $H_I$ and $H_S$ field vectors in FIGURE 6. A current pulse such as depicted in FIGURE 7B when applied to the strobe windings produces a field which momentarily rotates or fails to rotate the remanent magnetization from its biased position depending on the information contained in that particular storage element and the information being sought, all as previously described.

For the sake of clarity in illustrating the memory matrix in FIGURE 8, the interrogate windings 130–136 fully shown on planes 124 and 126 have been partially omitted from plane 120 and 122 while the strobe windings 140 through 146 fully shown on planes 120 and 122 have been partially omitted from planes 124 and 126. It should be understood, however, that each memory plane is provided with a complete interrogate line and a complete strobe line.

Common to each storage element occupying the same coordinate location in each plane is a separate output winding such as winding 150, i.e., there is one output winding for each word-register in the memory. Again, for clarity, only one such output winding is illustrated in FIGURE 8. For reasons as explained in relation to FIGURES 5 and 6, the sense winding 150 is arranged to run parallel to the strobe windings 140 through 146 in the regions where magnetic coupling exists between the storage element and the output winding. In this way the field produced by current flowing through the strobe windings alone induces only a small noise signal in the output winding. The signal from the output winding for each word register is impressed on an inverter or logical NOT circuit 160 which yields an output to an external indicator only when substantially no signal voltage is impressed thereon. In this way, a signal will result only when the word stored in the memory elements associated with the drive line in question is identical to the word being sought, as later explained in more detail.

The memory of this invention may be constructed in accordance with the Rubens et al. application, Serial No. 626,945, filed December 7, 1956, now Patent No. 3,030,612 entitled "Magnetic Apparatus and Methods." It is to be understood that this is just by way of one example, no limitation thereto being intended. That application in one embodiment teaches constructing a magnetic memory by laminating printed circuit conductors together and with a layer of thin ferromagnetic films to obtain an operable device. In this respect windings 130 through 136, 140 through 146, and 150 in FIGURE 8 may be prepared by using conventional printed circuit techniques. Consider, for example digit plane 121 and the windings therein associated. A copper layer and an insulation layer (not shown) may first be placed over the substrate 120 and the film elements 90 thereon with the insulation layer being next to the films. The copper layer may then be printed as by etching so that the winding line 130 remains. Next, layers of the insulating material, such as Mylar, and copper may be affixed over this assembly. Following this the second copper layer may be printed to form winding 140. The same procedure may be followed to form the portion of output winding 150 located in plane 121. This procedure may also be followed to form each of the planes defined by substrates 122, 124, and 126 and their associated windings. Since output winding 150 is an interplane line, means must be provided for establishing continuity of that line between the several digit planes. Such a device is described in the Anderson et al. application, Serial No. 771,519, filed November 3, 1958, now Patent No. 3,026,494.

To write information into the memory, use is made of coincident current techniques to alter the remanent state of certain selected storage elements. In FIGURE 8 there is illustrated an additional matrix array of AND gates represented by rectangles 162 in plane 151. Each word register comprises a different film element from each different plane; for example the vertically aligned films as magnetically threaded by line 190 may be considered a word register, with one AND gate 162 being provided for each different word register in the memory. Associated with each gate is one of a plurality of X drive lines 170, 172, 174, and 176 and one of a plurality of Y drive lines 180, 182, 184 and 186. A pair of drive pulses applied coincidently one to line 170 and one to line 180 causes the gate located at the intersection 188 of these lines to switch from the closed state to the open state and thereby produces an output pulse on the word drive line 190 which magnetically threads each memory element 90 contained in the word associated with the selected gate. Those gates to which only a single pulse or no pulse is applied do not switch and therefore produce no driving pulse on their associated word register drive lines. In orientation, line 190 as it crosses a thin film runs parallel to the preferred axis thereof. For clarity, only one word drive line, line 190, has been shown in FIGURE 8. However, it is understood that each word register has a separate word drive line which threads each memory element in that word register and which is oriented with respect to the storage elements therein at the same angle as is line 190.

Because the word drive lines cross the storage elements inductively coupled thereto, in a direction parallel to the respective preferred axes, the pulse applied via gate 192 to the word register drive line 190 produces a magnetic field transverse to the preferred axis of the film storage elements inductively coupled to drive line 190. As described in the aforementioned Rubens et al. application, Serial No. 626,945, now Patent No. 3,030,612, a transverse field acting alone is insufficient to produce reliable rotational switching of the film elements to which it is applied. In order to alter the information content of a particular storage element, a longitudinal field component applied anti-parallel to the preferred direction of remanent magnetization is required in addition to the transverse field. A separate winding line common only to all storage elements on a given plane and oriented to provide a longitudinal field component of magnitude less than that required to switch any associated film by the wall motion process, may be employed. However, to hold the intro-plane wiring to a minimum, use can be made of the strobe winding lines 140 through 146 to provide the required longitudinal field component even though these lines are not perpendicular to the preferred axis of the films since any field produced by current through a strobe line has a component parallel to the preferred axis of each film coupled thereto.

For the purpose of illustration, suppose it is desired to alter the information contained in one of the memory elements 90, for example element 91 located on substrate 122. A pair of pulses each insufficient in magnitude to switch gate 192, but in combination sufficient therefor, is applied simultaneously to X drive line 170 and Y drive line 180. This pair of pulses causes gate 192 to open and to produce an output pulse on word drive line 190 thereby establishing a field transverse to the preferred axis of element 91. At the same instant as the application of the drive pulses to lines 170 and 180, a pulse of proper polarity and direction is applied to strobe winding 142. The combined effect of the transverse field produced by current flowing through line 190 and the longitudinal field produced by current through strobe line 142, is to cause the remanent magnetization of the film element 91 to rotate to its opposite stable state of magnetization. It can be seen, therefore, that means is provided for loading or writing information into the memory using coincident current techniques.

Reference is now made to the operation of the memory of FIGURE 8 when functioning in its search mode. In the preferred manner of operation, the binary coded word being sought is set up in a predetermined binary coded register (not shown). The output from this register is applied bit by bit in parallel to preselected ones of interrogate lines 130 through 136 according to a known digit order such that each digit of the word being searched for is applied to a separate plane of the memory. For example, if the core word 1010 is being sought and a positive pulse represents a binary one while a negative pulse represents a binary zero, positive pulses would respectively be applied to interrogate windings 130 and 134 of substrates 120 and 124 while at the same time negative pulses would respectively be applied to the interrogate windings 132 and 136 of substrates 122 and 126. During the time interval that the plurality of interrogate pulses are still in effect, a plurality of strobe pulses from a suitable driving means (not shown) are simultaneously impressed on the terminals of the strobe windings 140 through 146 on all planes. If there is exact correspondence between the word being sought, i.e., 1010 in this example, and the information stored in one or more word registers in the word memory, there will be substantially no signal induced in the output line or lines inductively coupled to any such register. However, in all other output lines coupled to registers wherein exact correspondence does not exist, a signal is induced. As explained above relative to FIGURE 6, the direction of these induced voltages is such that they are additive and therefore no cancellation will take place. Because of the NOT circuits respectively connected to each output line an output will be provided only from those word registers whose associated output lines have no signal is induced thereon. In a large memory array it may be desirable to determine whether a word is present which begins with a certain group of digits (sub-word). If this is the case, it is necessary to apply strobe pulses only to a limited number of digit planes to determine whether a word starting with the desired code combination is actually present. Also, by properly selecting one or more interrogate lines in conjunction with one strobe line at a time, it is possible to non-destructively read-out each word in the memory at the same time or separately, digit by digit.

Thus, it is apparent that there are provided by this invention embodiments in which the various objects and advantages herein set forth are successfully achieved.

Modifications of this invention not described herein will be apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A non-destructive magnetic element sensing system comprising a bistable magnetic element having a magnetization axis along which the remanent magnetization of the element lies in first or second directions respectively representing first and second stable states, means for temporarily applying a first magnetic pulse field to said element at an angle to said axis for temporarily biasing the remanent magnetization to a position which is an angular distance from said axis in a clockwise rotational direction when the element is in one of said states and in a counterclockwise rotational direction when the element is in the other state without switching the element to its opposite stable state, means for applying to said element after the application but during the existence of said first field and at an angle thereto a second pulse field, which even in conjunction with said first field is insufficient to switch said element to its opposite stable state, for causing the remanent magnetization of said element to rotate from its biased position at least when said element is in its first state, and output means for sensing any change in the remanent magnetization of said element when said second field is applied thereto to provide an output signal indicative of the state of said element.

2. A non-destructive magnetic element sensing system comprising a bistable magnetic element having a magnetization axis along which the remanent magnetization of the element lies in first or second direction respectively representing first and second bistable states, winding means for only temporarily applying a first magnetic pulse field to said element at an angle to said axis for temporarily biasing the remanent magnetization to a position which is an angular distance from said axis in a clockwise rotational direction when the element is in one of said states and in a counterclockwise rotational direction when the element is in the other state without switching the element to its opposite stable state, means for applying to said element after the application but during the existence of said first field and at an angle thereto a second pulse field, which even in conjunction with said first field is insufficient to switch said element to its opposite stable state, for causing the remanent magnetization of said element to rotate from its biased position at least when said element is in its first state, and output means for sensing any rotation of the remanent magnetization of said element when the second field is applied thereto to provide an output signal indicative of the state of said element.

3. A system as in claim 2 wherein said second field is perpendicular to said first field.

4. A system as in claim 2 wherein the second field applying means ends the second field before the first field ends.

5. A system as in claim 2 wherein said bistable magnetic element is a ferrogmagnetic film.

6. A system as in claim 2 wherein said output means includes an output line inductively coupled to the element and having a longitudinal magnetic axis positioned at an angle to the said preferred axis of magnetization of the element.

7. A system as in claim 6 wherein the last mentioned angle is such that when the element exists in one stable state, the major component of change in flux resulting from remanent magnetization rotation by said second field is parallel to the longitudinal magnetic axis of the output line and when the element exists in the other stable state, the major component of change in flux resulting from remanent magnetization rotation by said second field is perpendicular to the longitudinal magnetic axis of the output line.

8. A system as in claim 2 wherein said first field is perpendicular to the said preferred axis of said element.

9. A system as in claim 2 wherein said first field is applied at an acute angle to the said preferred axis.

10. A system as in claim 2 wherein said second field is in alignment with the said preferred axis of said element.

11. A system as in claim 2 wherein said second field is applied at an angle to said preferred axis.

12. Apparatus as in claim 2 wherein said first field is of a predetermined magnitude to temporarily bias the remanent magnetization to a position parallel to the direction of said second field when the element is in one stable state, and to an angular position with respect to the direction of the second field when the element is in its other stable state.

13. Apparatus as in claim 2 wherein said first field is of a predetermined magnitude and direction to temporarily bias the remanent magnetization to a position antiparallel to the direction of said second field when the element is in one stable state, and to an angular position with respect to the direction of the second field when the element is in its other stable state.

14. A system as in claim 2 and further including a NOT circuit coupled to receive said output signal for producing an output when the said output signal is relatively small and for producing substantially no output when the said output signal is relatively large.

15. A system as in claim 2 and further including an AND circuit having inputs in time coincidence with the first and second fields respectively and another input receiving said output signal for producing an output only while all three inputs coexist.

16. Apparatus as in claim 15 and further including means connected to the output of said AND circuit for discriminating between differences of a characteristic of successive outputs of the AND circuit.

17. A non-destructive magnetic element sensing system comprising a bistable magnetic film element having an easy magnetization axis along which the remanent magnetization of the core lies in first or second directions respectively representing first and second bistable states, a first elongated conductive sheet having its longitudinal axis aligned with said easy axis and activated by a first pulse for applying a magnetic field temporarily to said element at a right angle to said easy axis for temporarily biasing the remanent magnetization to a position which is a substantial angular distance from said axis by rotating the remanent magnetization in a clockwise rotational direction when the element is in one of said stable states and in a counterclockwise rotational direction when the element is in the other stable state without switching the element to its opposite stable state, a second elongated conductive sheet having its longitudinal axis transverse to said easy axis and activated by a second pulse embraced in time by said first pulse for applying to said bistable element after the application but during the existence of said biasing field and perpendicular thereto a second field having a duration less than the biasing field and being insufficient even in conjunction with said biasing field to switch said element to its opposite stable state, for causing the remanent magnetization to rotate further away from said easy axis when the second field mainly opposes the biased remanent magnetization and for causing the remanent magnetization to rotate toward the easy axis at other times, a third elongated conductive sheet for sensing any rotational change of the remanent magnetization and producing corresponding output signals, an AND circuit having inputs respectively receiving said first pulse, second pulse, and output signals for producing an output only during the occurrence of said second pulse, which output is indicative by a characteristic thereof of the stable state of said element.

18. A non-destructive magnetic element sensing system comprising a bistable magnetic film element having an easy magnetization axis along which the remanent magnetization of the core lies in first or second directions respectively representing first and second bistable states, a first elongated conductive sheet having its longitudinal axis aligned with said easy axis and activated by a first pulse for applying a magnetic field temporarily to said element at a right angle to said easy axis for temporarily biasing the remanent magnetization to a position which is a substantial angular distance from said axis by rotating the remanent magnetization in a clockwise rotational direction when the element is in one of said stable states and in a counterclockwise rotational direction when the element is in the other stable state without switching the element to its opposite stable state, a second elongated conductive sheet having its longitudinal axis transverse to said easy axis and activated by a second pulse embraced in time by said first pulse for applying to said bistable element after the application but during the existence of said biasing field and perpendicular thereto a second field having a duration less than the biasing field and being insufficient even in conjunction with said biasing field to switch said element to its opposite stable state, for causing the remanent magnetization to rotate further away from said easy axis when the second field mainly opposes the biased remanent magnetization and for causing the remanent magnetization to rotate toward the easy axis at other times, a third elongated conductive sheet for producing an output signal by sensing any rotational change of the remanent magnetization, said third sheet being oriented relative to the biased remanent magnetization position such that when said magnetic element exists in a first stable state the major component of the change in flux resulting from remanent magnetization rotation by said second field is substantially parallel to the longitudinal magnetic axis of said third elongated sheet and when said magnetic element exists in said second stable state the major component of said change in flux is substantially perpendicular to said longitudinal magnetic axis, an AND circuit having inputs respectively receiving said first pulse, second pulse, and output signal for producing an output only during the occurrence of said second pulse which output is indicative by its amplitude of the stable state of said element.

19. A non-destructive magnetic element sensing system comprising a bistable magnetic element having a magnetization axis along which the remanent magnetization of the element lies in first or second directions respectively representing first and second bistable states, winding means for only temporarily applying a first magnetic field to said element at an angle to said axis for temporarily biasing the remanent magnetization to a position which is an angular distance from said axis in a clockwise rotational direction when the element is in one of said states and in a counterclockwise rotational direction when the element is in the other state without switching the element to its opposite stable state, means for applying to said element after the application but during the existence of said first field and at an angle thereto a second field, which even in conjunction with said first field is insufficient to switch said element to its opposite stable state, for causing the remanent magnetization of said element to rotate from its biased position at least when said element is in its first state, and an output line for sensing any rotational change of the remanent magnetization from its biased position upon the application of said second field, said output line having its longitudinal magnetic axis in alignment with the direction of the second field whereby the remanent magnetization rotates from its biased position only when the magnetic element is in one but not the other of its stable states.

20. A non-destructive magnetic element sensing system comprising a bistable magnetic element having a preferred axis of magnetization along which the remanent magnetization of the element lies in first or second directions respectively representing first and second bistable states, a first drive line inductively coupled to said element and oriented at an angle to said preferred axis of magnetization, said first drive line producing by current passing therethrough a first magnetic field for biasing the remanent magnetization a substantial angular distance from said axis in a clockwise rotational direction when the element is in one of said states and in a counterclockwise rotational direction when the element is in the other state without switching the element to its opposite stable state, a second drive line inductively coupled to said element and oriented transverse to said first drive line, said second drive line producing by current passing therethrough a second magnetic field insufficient even in conjunction with said first field to cause the element to change stable states and oriented at a right angle to said first field, said first field being of a predetermined magnitude to temporarily bias the remanent magnetization to a position anti-parallel to the direction of the second field when the element is in one stable state and to an acute angular position with respect to the direction of the second field when the element is in its other stable state, said second field further rotating the remanent magnetization when in said other stable state and causing no further rotation thereof when the element is in said one state, an output line inductively coupled to said element and oriented parallel to said second drive line for producing a signal upon the further rotation of the remanent magnetization due to the application of the second field, said signal being indicative that the element exists in said other state while a lack of a signal therefrom during the application of the second field is indicative that the element exists in said one state.

21. A non-destructive magnetic element sensing system comprising a bistable magnetic element having a preferred axis of magnetization along which the remanent magnetization of the element lies in first or second directions respectively representing first and second bistable states, a first drive line producing by current passing therethrough a first magnetic field for biasing the remanent magnetization a substantial angular distance from said axis in a counterclockwise rotational direction when the element is in one state and in a clockwise rotational direction when the element is in its other state without switching the element to its opposite stable state, a second drive line inductively coupled to said element and oriented transverse to said first drive line for producing by current passing therethrough a second magnetic field insufficient even in conjunction with said first field to cause the element to change stable states and oriented at a right angle to said first field, said first field being of a predetermined magnitude to temporarily bias the remanent magnetization to an acute angular position with respect to the second field when the element is in one stable state and to a position which is substantially zero degrees relative to the direction of the second field when the element is in its other stable state, said second field further rotating the remanent magnetization when in its one stable state and causing no further rotation thereof when the element is in said other state, and output line inductively coupled to said element and oriented parallel to said second drive line for producing a signal upon the further rotation of the remanent magnetization due to the application of the second field, said signal being indicative that the element exists in said one state while a lack of a signal therefrom during the application of the second field is indicative that the element exists in the said other state.

22. A non-destructive magnetic element sensing system comprising an array of bistable magnetic elements each having a magnetization axis along which the remanent magnetization of the element lies in first or second directions respectively representing first and second bistable states, means for temporarily applying a first magnetic pulse field to predetermined ones of said elements for biasing the remanent magnetization of each such element to a position which is an angular distance from its magnetization axis in a clockwise rotational direction when that element is in one of its states and in a counterclockwise rotational direction when that element is in the other of its states without switching any of the said predetermined elements, means for applying to certain of said elements including at least one of said predetermined elements after the application but during the existence of said first field and at an angle thereto a second pulse field, which even in conjunction with said first field is insufficient to switch any element to its opposite stable state, for causing the remanent magnetization of any element receiving both said fields to rotate from its biased position at least when such element is in its first state, and output means for sensing any change in the remanent magnetization of any element receiving both said fields to provide an output signal indicative of the state of said element.

23. A non-destructive magnetic element sensing system comprising a plurality of bistable magnetic elements arranged in first and second sets in a matrix having at least two dimensions, each element being contained in a first and second set and having a preferred magnetization axis along which the remanent magnetization of the element lies in first or second directions respectively representing first and second bistable states, means for temporarily applying a first magnetic pulse field to any one of said first sets selectively and at an angle to the preferred axis along which the remanent magnetization of each element in the selected first set lies for temporarily biasing without switching the remanent magnetization of each element in the selected first set to a position which is an angular distance from its respective preferred axis in a clockwise rotational direction when its remanent magnetization exists in one stable state and in a counterclockwise rotational direction when its remanent magnetization exists in the other stable state, means for selectively applying to any one of said second sets after the application but during the existence of said first field in a direction parallel to each preferred axis of magnetization of the elements in a selected second set along which the remanent magnetization lies a second pulse field having a duration less than the first field and which even in conjunction with said first field is insufficient to switch any element in a selected second set to its opposite state for causing further rotation of the remanent magnetization of any element contained in the selected second set which element is in a biased position due to the first field while causing no further rotation of the remanent magnetization of the elements contained in said second set which elements are in their unbiased state, and means for sensing the rotation of the remanent magnetization from its biased position to provide an output signal indicative by its amplitude of the state of any element receiving both fields.

24. A non-destructive magnetic element sensing system comprising a plurality of bistable magnetic elements arranged in first and second sets in a matrix having at least two dimensions, each bistable element being contained both in a first and second set and having a preferred axis along which the remanent magnetization of the element lies in first or second directions respectively representing first and second bistable states, means for temporarily applying a first magnetic pulse field to any one of said first sets selectively and at an angle to the preferred axis along which the remanent magnetization of each element lies for temporarily biasing without switching the remanent magnetization of each element in the selected first set to a position which is angular distance from its respective preferred axis in a clockwise rotational direction when its remanent magnetization exists in one stable state and in a counterclockwise rotational direction when its remanent magnetization exists in the other stable state, means for selectively applying to any one of said second sets during the existence of said first field a second pulse field, which even in conjunction with said first field is insufficient to switch any element in a selected second set to its opposite state, for causing rotation from its biased position of the remanent magnetization of any element receiving both of the first and second fields when that element is in a first state, and output means for sensing any change in the remanent magnetization of any element receiving both fields to provide an output signal indicative of the state of said element.

25. A system as in claim 24 wherein said first field is perpendicular to said second field.

26. A system as in claim 24 wherein said first and second field applying means are respectively a first and second plurality of drive lines, the lines in said first plurality being respectively inductively coupled to said first sets of elements and the lines in said second plurality being respectively inductively coupled to said second sets of elements, said first and second pluralities of drive lines being oriented transversly of each other with each drive line in at least one of the said pluralities of drive lines having its longitudinal physical axis at an angle to the preferred axes of the elements to which it is coupled.

27. A system as in claim 26 wherein each line of said first plurality of drive lines has its longitudinal physical axes in alignment with the preferred axes of magnetization of each element to which it is coupled.

28. A system as in claim 26 wherein each line of both said first and second pluralities of drive lines is angulated with respect to any axis of magnetization of an element to which it is coupled.

29. A system as in claim 24 wherein said output means include an output line inductively coupled to all the elements in the matrix.

30. A system as in claim 29 wherein the output line is oriented perpendicular to the said axis of magnetization of each element.

31. A system as in claim 29 wherein the output line has its longitudinal magnetic axis in alignment with said second field.

32. A system as in claim 24 and further including an AND circuit having inputs receiving signals in time coincidence with said first and second fields respectively and said output signal for producing an output only upon application of said second field.

33. A non-destructive magnetic element sensing system comprising a plurality of bistable magnetic elements arranged in columns and rows in a matrix having two dimensions, each bistable element being contained both in a column and a row and having at least one preferred magnetization axis along which the remanent magnetization of the element lies in first or second directions respectively representing first and second bistable states, said preferred axis of each element being respectively aligned, a first plurality of drive lines selectively activated by a first pulse and inductively coupled respectively to said first sets of elements, each drive line thereof being respectively oriented parallel to said preferred magnetization axis of each element inductively coupled thereto, a preselected one of said first plurality of drive lines producing a first magnetic field transverse to said preferred magnetization axes by current flowing therethrough due to said first pulse for temporarily biasing the remanent magnetization of each element receiving the first field a substantial angular distance from its preferred axis in a clockwise rotational direction when that element is in one stable state and in a counterclockwise rotational direction when that element is in its other stable state without switching any element to its opposite state, a second plurality of drive lines selectively activated by a second pulse and inductively coupled respectively to said second sets of elements, each drive line of said second plurality being respectively oriented perpendicular to said preferred magnetization axis of each element inductively coupled thereto, a preselected one of said first plurality of drive lines producing by current passing therethrough due to said second pulse a second magnetic field parallel to said preferred magnetization axes having a duration less than the first field and which even in conjunction with said first field is insufficient to switch any element to its opposite state for causing further rotation of the remanent magnetization of the element contained in the selected second set of cores inductively coupled thereto which is in a biased position due to the first field while causing no further rotation of the remanent magnetization of the elements contained in said second set which are in their unbiased state, an output line coupled to all the elements in the matrix and oriented perpendicular to said preferred axis of magnetization for sensing the rotation of the remanent magnetization from its biased position and thereby providing an output signal indicative of the state of said element, an AND circuit having a different input respectively from the first pulse, the second pulse and the output line for producing an output only when there is a simultaneous existence of signals on all three inputs, and means connected to the output of said AND circuit for producing an output when activated by a relatively large signal and for producing no output when activated by a relatively small signal.

34. A magnetic memory comprising a bistable magnetic storage element having a preferred axis of magnetization along which binary information is stored by placing the element in one or the other of its stable states, means for temporarily applying a first magnetic pulse field to said element in one direction to determine if it is in a first stable state and in the opposite direction to determine if it is in a second stable state, means for applying a second magnetic pulse field after the application but during the existence of said first field to said storage element in a direction transverse to the direction of the first field, and means inductively coupled to said storage element for sensing the output thereof during the application of said second magnetic field.

35. Apparatus as in claim 34 wherein said first and second fields are of predetermined magnitudes insufficient even in combination to switch the storage element.

36. In a memory matrix having a plurality of bistable magnetic storage elements arranged on a plurality of digit planes, each bistable element having a preferred axis of magnetization along which binary information is stored by placing the element in one or the other of its stable states, means for temporarily applying a first magnetic pulse field in one direction to the storage elements in selected digit planes to determine if said storage elements are in a first stable state and in the opposite direction to the storage elements in other selected planes to determine if the elements in said planes are in a second stable state, means for applying a second magnetic field while said first field is still effective to the storage elements in said plurality of digit planes in a direction transverse to the directions of said first field, and means inductively coupled to the storage elements in said matrix for sensing the output of said storage elements during the application of said second magnetic field.

37. Apparatus as in claim 36 wherein said first and second fields are of a predetermined magnitude insufficient even in combination to switch the storage elements in said matrix.

38. A memory matrix comprising a plurality of bistable magnetic film elements arranged in a plurality of planes, the film elements in each plane being further arranged into rows and columns, said film elements each having a preferred axis of magnetization along which the remanent magnetization thereof lies in first or second directions respectively representing first and second bistable states, said matrix storing information in word registers according to a known digit order by predetermined stable state settings of the elements contained therein, means for non-destructively locating preselected information of known binary coding and of unknown storage location, said means including a first plurality of lines at least one per plane inductively coupled to all the elements contained therein for applying a first plurality of magnetic fields to said planes of elements in one of two angular directions with respect to the preferred axes of the respective elements, each magnetic field when in a first of said two directions causing the remanent magnetization of each element inductively coupled thereto which exists in a first stable state to be biased temporarily an angular distance from its respective preferred axis in a clockwise rotational direction while causing the remanent magnetization of those elements inductively coupled thereto which exist in a second stable state to be biased temporarily an angular distance from its respective preferred axis in a counterclockwise rotational direction without switching any element to its opposite stable state, each magnetization field when in the second of said two directions causing the remanent magnetization of each element inductively coupled thereto which exists in said first stable state to be biased temporarily an angular distance from its respective preferred axis in a counterclockwise rotational direction while causing the remanent magnetization of those elements inductively coupled thereto which exist in said second stable state to be biased temporarily an angular distance from its respective preferred axis in a clockwise rotational direction without switching any element to its opposite stable state, a second plurality of lines at least one per plane inductively coupled to all the elements contained therein for applying a second plurality of magnetic fields to said planes of elements during the existence of said first plurality of fields and at an angle thereto, each magnetic field in the second plurality of fields having a duration less than each field in the first plurality of fields and being even in conjunction with its corresponding field in the first plurality of fields insufficient to switch any of the elements inductively coupled thereto to its opposite stable state, each field of said first plurality of fields when applied in said first direction being of a predetermined magnitude to cause the remanent magnetization of the elements respectively coupled thereto which exist in said first stable state to be biased to a position anti-parallel to the direction of the field in said second plurality of fields which is inductively coupled thereto while causing the remanent magnetization of each element inductively coupled thereto which exists in said second stable state to be biased to an angular position with respect to the field from said second plurality of fields which is inductively coupled thereto, each field of said first plurality of fields when applied in said second direction being of a predetermined magnitude to cause the remanent magnetization of the elements respectively coupled thereto which exist in said first stable state to be biased to an angular position with respect to the direction of the field in said second plurality of fields which is inductively coupled thereto while causing the remanent magnetization of each element inductively coupled thereto which exists in said second state to be biased parallel to the direction of the field from said second plurality which is inductively coupled thereto, each field in said second plurality of fields thereby causing no further rotation of the remanent magnetization of the elements inductively coupled thereto which in their biased positions are parallel or anti-parallel thereto, while causing further rotation of the remanent magnetization of the elements inductively coupled thereto which in their biased positions are at an angle thereto, said first plurality of lines being activated by a plurality of signals, each signal being of one of two polarities predetermined in accordance with the binary coding of said preselected information, said signals being placed on preselected ones of said first plurality of lines according to the known digit order and causing thereby the first plurality of magnetic fields, said second plurality of lines being activated by a plurality of signals each having the same polarity placed on preselected ones of the second plurality of lines according to the binary code of the preselected information, and a plurality of output lines at least one different line inductively coupled to all the elements contained in each word register and oriented to have its longitudinal magnetic axis parallel to said second plurality of fields, each output line respectively producing a signal upon the further rotation of the remanent magnetization of any element inductively coupled thereto, the arrangement being such that the absence of a signal from an output line during the application of said first and second plurality of fields is indicative that the preselected information is stored in the elements coupled thereto.

39. Apparatus as in claim 38 wherein each field of said second plurality of fields is perpendicular to a corresponding one of said first plurality of fields.

40. Apparatus as in claim 38 wherein there is further included a different "NOT" circuit connected to each output line, the arrangement being such that the presence of a signal from a NOT circuit is indicative that the preselected information is stored in the elements associated therewith.

41. Apparatus as in claim 38 wherein each output line is oriented such that its longitudinal magnetic axis lies at an angle ranging from 30° to 45° with respect to the preferred axis of magnetization of each element inductively coupled thereto.

42. Apparatus as in claim 38 wherein there is further included writing means for selectively altering the remanent magnetization of the elements therein.

43. Apparatus as in claim 42 wherein said writing means includes a plurality of AND circuits, one per word register, a third plurality of drive lines respectively connected to said plurality of AND circuits, one line per AND circuit for the enabling thereof, a fourth plurality of drive lines respectively connected to said plurality of AND circuits, one line per AND circuit for causing an output pulse from its associated AND circuit when said AND circuit is enabled, and a fifth plurality of lines connected one to each AND circuit output and inductively coupled one to all the elements in each word register, each line of said fifth plurality when activated by a respective AND circuit output pulse being effective to produce a field transverse to the preferred axis of each element inductively coupled thereto.

44. Apparatus for providing binary signals of substantially different amplitudes on an output line coupled to a magnetic element in accordance with the polarity of an input signal comprising a multistable magnetic element existing in a given one of its stable remanent states with its magnetization along an easy axis, an output line coupled to said element, means for selectively applying one of opposite polarity first and second pulse fields at an oblique angle to said axis for biasing said magnetization in one angular direction substantially to an acute angle from said easy axis when said first field is applied and in an opposite angular direction when said second field is applied, and means for applying a third field after the application but during the existence of the applied first or second field and along an axis disposed substantially at said acute angle from said easy axis to cause a relatively large or relatively small signal on said output line according to which of said opposite polarity fields was applied.

References Cited in the file of this patent

UNITED STATES PATENTS

| | | |
|---|---|---|
| 2,774,056 | Stafford | Dec. 11, 1956 |
| 2,973,508 | Chadurjian | Feb. 28, 1961 |
| 3,015,807 | Pohm | Jan. 2, 1962 |
| 3,023,402 | Bittmann | Feb. 27, 1962 |

OTHER REFERENCES

"Nondestructive Sensing of Magnetic Cores," by D. A. Buck and W. I. Frank, in "Communications and Electronics," January 1954, pages 822–830.

"Thin Films, Memory Elements . . . ," published in "Electrical Manufacturing," January 1958, pages 95–98.